STUART DUNCAN DAVIES
JOHN ALFRED CHILMAN
INVENTORS

United States Patent Office 3,476,486
Patented Nov. 4, 1969

3,476,486
GAS TURBINE ENGINES
Stuart Duncan Davies and John Alfred Chilman, Painswick, England, assignors to Dowty Rotol Limited, Gloucester, England
Filed Apr. 12, 1967, Ser. No. 630,255
Claims priority, application Great Britain, Apr. 12, 1966, 16,008/66; May 25, 1966, 23,428/66, 23,429/66; Sept. 16, 1966, 41,454/66
Int. Cl. F04d 27/00; F02k 3/02
U.S. Cl. 415—68
17 Claims

ABSTRACT OF THE DISCLOSURE

An aircraft propulsion system comprises a gas turbine engine in combination with means such as a fan of variable and reversible pitch, for providing a flow of pressure air along a duct ahead of the engine compressor and for reversing the direction of air flow along the duct at will. Means, for example flap valves, may be provided for ensuring a flow of air to the inlet of the compressor when the direction of air flow in the duct is reversed.

---

Figure 1:
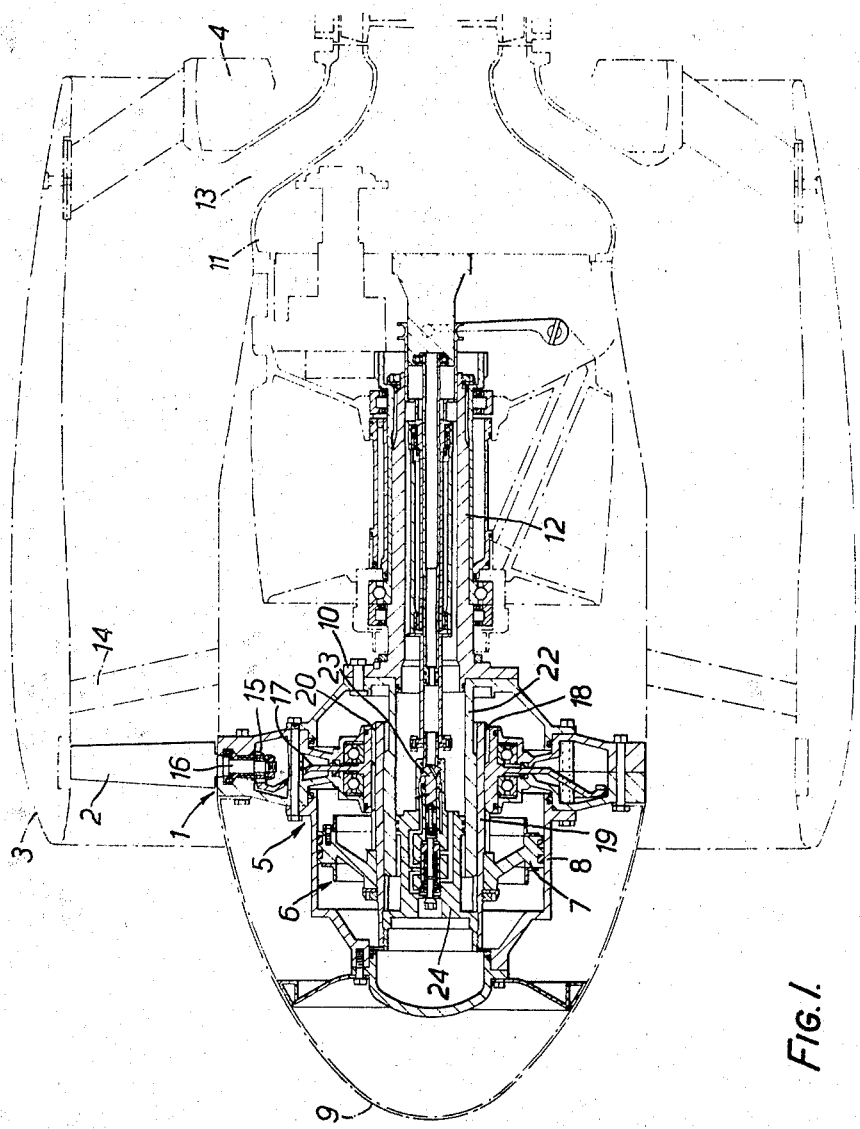

This invention relates to gas turbine engines, more particularly gas turbine engines of the ducted-fan by-pass type, and to propulsion systems for aircraft or other vehicles utilising such engines, hereinafter termed aircraft propulsion systems.

In its broadest aspect the invention consists of an aircraft propulsion system comprising a gas turbine engine in combination with means for providing a flow of pressure air along a duct ahead of the engine compressor and for reversing the direction of air flow along the duct at will. It will be understood that the term "ahead" is used herein in the aerodynamic sense, i.e. to indicate that the fan is upstream of the engine having regard to the direction of air flow through the latter.

The fan may be adapted to provide the reversible air flow in the duct, and thus a gas turbine engine in accordance with one feature of the invention may include a fan rotatable in a duct, the fan being mounted ahead of the engine compressor and having its blading effectively reversible for reversing the direction of air flow along the duct.

As the reversible fan charges the duct and the compressor it may be necessary to provide means to ensure an adequate flow of air to the inlet of the compressor from the duct when the direction of air flow is reversed. Thus, according to another feature of the invention, a gas turbine engine includes a fan rotatable in a by-pass duct ahead of the engine compressor to provide a flow of pressure air to the inlet of the compressor, means for reversing the direction of air flow along the duct and means for ensuring a flow of air to the inlet of the compressor when the direction of air flow is reversed.

The fan preferably has reversible pitch blading, said means for reversing the direction of air flow along the duct comprising means for putting the blades into negative pitch during rotation of the fan. In addition to being of reversible pitch, the fan blading may also be of variable pitch, as a result of which further advantages accrue.

Thus, by means of the invention a reverse thrust component is obtainable to afford aerodynamic braking of an aircraft on landing. Moreover, in the preferred embodiment, what is virtually a variable by-pass engine results, with the ability to vary the relative magnitude of air mass flow rates through the turbine and the by-pass in accordance with certain flight parameters, one of which is air speed.

It is desirable that the pitch of the fan blading should be infinitely adjustable throughout a range which includes not only positive and negative pitch but also zero, or near zero, pitch and the feathered position, i.e. a blade position at 90° to zero pitch. The ability to achieve ultra-fine pitch, i.e. zero or near zero pitch, is advantageous when starting certain types of engine in order to reduce the fan load on the engine, and the ability to achieve the feathering position reduces the otherwise high windmilling drag which would occur in the event of engine failure in flight. The change from positive to negative pitch of the fan blading conveniently occurs through zero pitch, but in some cases it may be preferred that the blades should pass through the feathered position when changing from positive to negative pitch.

Said means for ensuring a flow of air to the inlet of the compressor when the direction of air flow is reversed may comprise flap valve means in association with supplementary air entry slightly aft of the compressor inlet, such valve means being operable to ensure that air is drawn smoothly into the compressor when the flow of air passes forwardly along the duct.

Instead of the aforesaid flap valve means a fixed deflector may be suitably arranged in the duct for the same purpose, or an axially movable deflector may be employed which can be suitably positioned according to the direction of air flow in order to deflect a portion of the air flow into the inlet of the compressor as before. Alternatively splitting off from the air flowing forwardly in the duct of a portion of the flow into the inlet of the compressor may be induced by boundary layer control for example by the application of suction at a suitable point in the duct. As a further alternative a tiered fan construction may be employed to provide two concentric annular flow paths, an inner to the inlet of the compressor and an outer to the by-pass.

Whichever of the foregoing alternatives is employed, the ducted fan arrangement may be basically similar in all cases. That is to say, the half-section of the static duct may be of aerofoil form with the annular leading edge of the duct disposed just ahead of the fan blading but rearwardly of the nose portion of a spinner forming part of the rotative fan assembly. The duct may extend rearwardly around the driving means and/or reduction gearing for the fan and its trailing edge may be disposed somewhat rearwardly of the inlet of the compressor. Such inlet may take the form of an annular rearwardly and inwardly inclined duct branched from the fan duct.

Except when a fixed deflector is employed, the means for ensuring a flow of air to the inlet of the compressor during reverse air flow along the duct may be linked to the fan blade pitch-reversing control mechanism so that when the blades are put into reverse pitch the flap valve or other means are operated in an appropriate manner. The flap valve means may take the form of a series of pivoted flap valves which overlap each other and form an annulus which closes the supplementary air entry. When the fan blades are put into reverse pitch the flap valves open to uncover the supplementary air entry and they may then project into the reverse air flow to split the latter and deflect a portion into the inlet of the compressor.

The invention will now be further described with reference to the accompanying drawings which illustrate, by way of example, several engine arrangements in accordance with the invention. In the drawings:

FIGURE 1 is an axial sectional view of the front end of one engine arrangement, and FIGURES 2 to 6 are diagrammatic longitudinal views, partly in section, illustrating alternative modifications of the same basic engine as that shown in FIGURE 1.

The engine is of the by-pass type and includes a fan, indicated generally by the reference numeral 1, having variable pitch blading 2 and rotatable in a static by-pass duct 3. The fan 1 is mounted at the forward end of the engine ahead of the engine compressor, the outline of the forward end of which is indicated at 4, with the blading 2 effectively adjustable under the control of a servo system of the closed-loop type housed within the hub structure 5 of the fan. The servo system comprises a hydraulic pitch-change motor 6 of the piston and cylinder type, comprising a piston 7 slidable in a forwardly projecting cylinder 8 forming part of the hub structure 5 and housed within a sheet metal spinner 9. As will be clearly seen in FIGURE 1, which illustrates the internal details of the fan, the construction provides a rotative fan assembly bolted to a driving flange 10 on the forward end of a drive shaft 12 which, in this case, is a reduction gearbox shaft. The reduction gearbox is illustrated in a general manner at 11.

The half-section of the static duct 3 is of aerofoil form with the annular leading edge of the duct 3 disposed just ahead of the fan blading 2 but rearwardly of the spinner 9 forming part of the rotative fan assembly. The duct 3 extends rearwardly around the reduction gearbox 11 and its trailing edge is disposed somewhat rearwardly of an inlet 13 of the compressor 4. The inlet 13 takes the form of an annular rearwardly and inwardly inclined duct branched from the fan duct 3. A ring of stator blades 14 of fixed pitch is mounted within the duct 3 rearwardly of the fan 1 and ahead of the compressor inlet 13.

Referring to FIGURE 1, the pitch-changing mechanism illustrated therein is only one of several forms which could be employed, and as it forms no part of the present invention it will only be described in sufficient detail to allow its manner of operation to be understood. A small bevel pinion 15 is fast on the root 16 of each blade 2, and the multiplicity of pinions 15 all mesh with a relatively large bevel gear 17 which is rotatably mounted within the hub structure 5. Thus, rotation of the bevel gear 17 effects pitch variation of all the blades 2 in unison, and this varies the by-pass ratio and in effect provides a variable first compressor stage.

The fan has a large multiplicity of blades 2, for example of the order of seventeen or more, and axial movement of the piston 7 is converted to rotary movement of the gear 17 by a helical cam mechanism provided by meshing helical teeth at 18. These teeth are respectively formed within the boss of the bevel gear 17 and on a tubular piston portion 19 on which the piston 7 is mounted. To prevent rotation of the portion 19 it is formed with internal straight spline teeth which mesh at 20 with complementary teeth on a forwardly projecting spigot portion 22 of the hub structure 5. Operation of the motor 6 is controlled by a follow-up servo valve 23 mounted in a cylinder piston portion 24 which slides within the spigot 22 and is fixed to the piston portion 19.

The mechanism described enables the blades 2 to be put into negative pitch during rotation of the fan 1 with resultant reversal of flow along the duct 3. Thus, a reverse thrust component is obtainable to afford aerodynamic braking of an aircraft on landing. The pitch of the blading 2 is moreover infinitely adjustable throughout a range including positive and negative pitch angles, the change from positive to negative pitch occurring through zero pitch which is thus obtainable to facilitate engine starting. The blading 2 can be moved through coarse positive pitch to the feathered position, with attendant advantages in the event of engine failure during flight.

With the blading 2 in negative pitch and reverse air flow occurring along the duct 3, it is nevertheless desirable to ensure an adequate flow of air to the compressor inlet 13 and FIGURES 2 to 6 illustrate several alternative means of achieving this. In each of these figures the upper half thereof illustrates normal flight conditions with the fan blading 2 in positive pitch, i.e. with the air flow passing rearwardly along the duct 3, and the bottom half illustrates the reverse condition.

Figure 2:
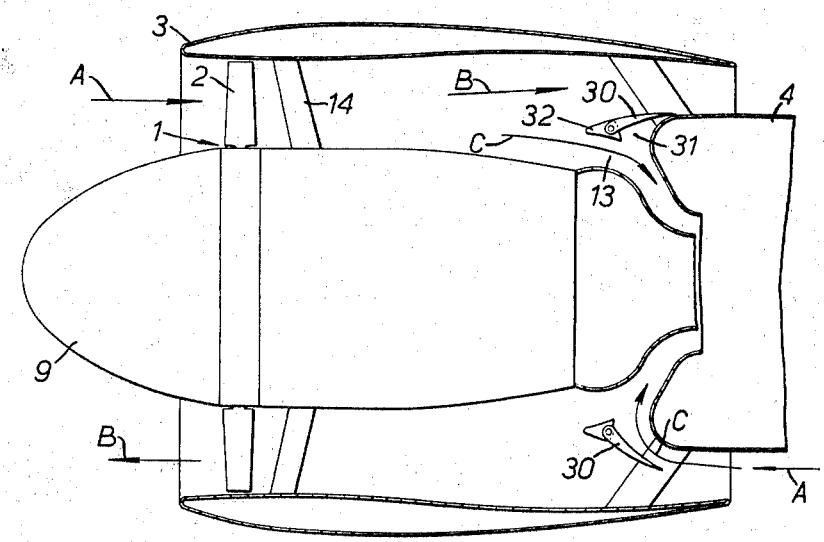

In the arrangement illustrated in FIGURE 2 a circumferential series of flap valves 30 overlap each other to form an annulus. With the fan blading 2 in positive pitch the flap valves 30 close a supplementary air entry 31 of the compressor 4 slightly aft of the inlet 13 and divided from the latter by a streamlined stationary ring 32 on which the valves 30 are mounted. Thus, in effect, the compressor 4 has a branched entry and the ring 32 divides the total air flow along the duct, indicated by the arrow A, into an outer flow indicated by the arrow B continuing along the duct 3 and an inner flow indicated by the arrow C.

The flap valves 30 are linked to the fan blade pitch-reversing control mechanism so that when the fan blades 2 are put into reverse pitch the flap valves 30 are opened as shown in the bottom half of FIGURE 2. The flow of air which now passes forwardly along the duct 3 is split, on reaching the flap valves 30 into an outer flow B and an inner flow C, as before, respectively continuing forwardly along the duct 3 and passing rearwardly and inwardly of the flap valve 30 into the inlet of the compressor 4 through the supplementary air entry 31.

Figure 3:
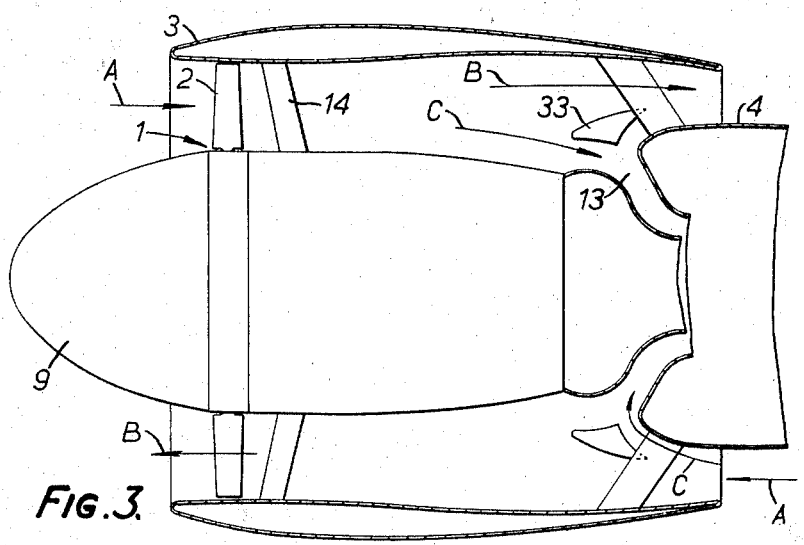

In the arrangement illustrated in FIGURE 3 a fixed annular deflector 33 is positioned in a region surrounding the compressor inlet 13 within the duct 3 and operates in exactly the same manner as already described. The form of the deflector 33 is such that flow paths to the inlet 13 of the compressor are provided both forwardly and inwardly of the deflector 33 and rearwardly and inwardly of the latter, so that splitting off of an inner flow C of air to the inlet 13 of the compressor 4 is achieved whether the air flow is rearwardly or forwardly along the duct 3.

Figure 4:
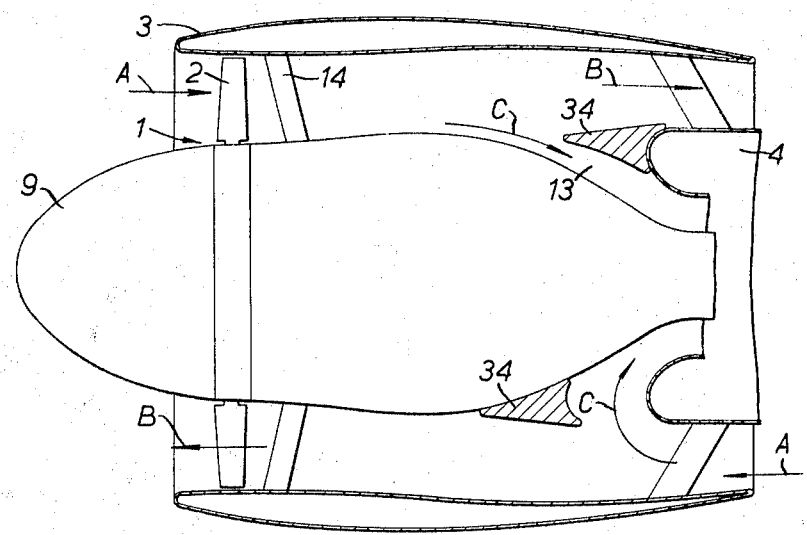

In the arrangement illustrated in FIGURE 4 an axially slidable deflector 34 is provided which has two operative positions, as shown respectively in the upper and lower halves of that figure, to split the flow A into outer and inner flows B and C. During conditions of rearward flow along the duct 3 the deflector 34 abuts the rear side of the inlet 13 to provide an inner flow path forwardly and inwardly of the deflector 34; in conditions of forward flow along the duct 3 the deflector 34 abuts the forward edge of the inlet 13 so that the inner flow path is now disposed rearwardly and inwardly of the deflector 34. The deflector 34 is again linked to the fan blade pitch-reversing control mechanism so that when the blades 2 are put into reverse pitch the deflector moves to the appropriate forward position.

Figure 5:
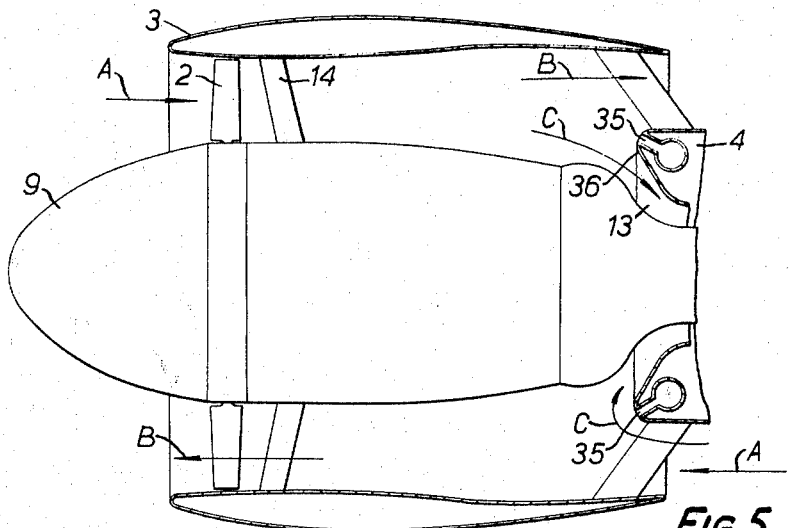

In the arrangement illustrated in FIGURE 5 a ring of suction nozzles 35 is positioned in the annular leading edge 36 of the rear wall of the compressor inlet 13 where it branches from the fan duct 3. Suction is applied to the nozzles 35 to induct a flow of air into the inlet 13 when the fan blading 2 is put into negative pitch in order to cause a forward flow of air along the fan duct 3. The nozzles 35 are fed by means of an injector pump driven, for example, from an engine compressor bleed in order to provide a depression immediately ahead of the radiused leading edge 36, whereby a portion C of the total air flowing forwardly in the duct 3 is split off and flows rearwardly and inwardly into the compressor inlet 13. The injector pump drive is linked to the fan blade pitch reversing control so that the two operations occur simultaneously.

Figure 6:
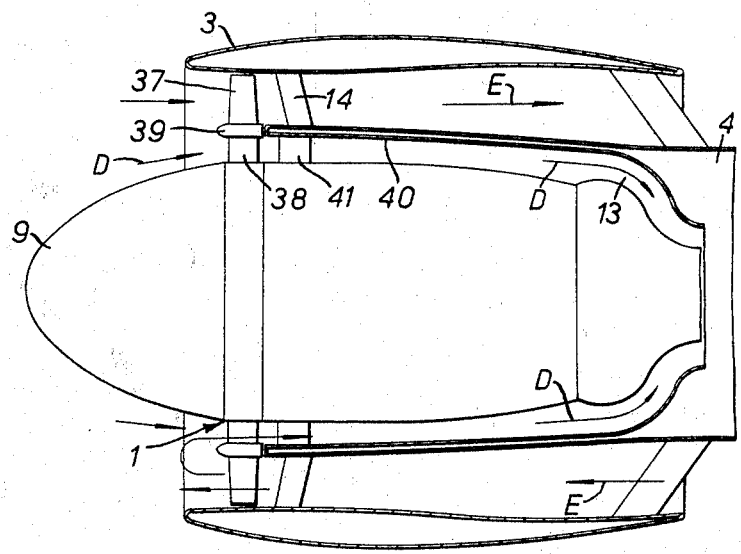

The arrangement illustrated in FIGURE 6 provides a construction in which the air flow D into the compressor inlet 13 is independent of the pitch of the blading of the fan 1, and also independent of the air flow E along the duct 3 whether the latter flow is rearwardly or forwardly of the duct. To this end the fan blading is arranged in two concentric tiers, an outer tier 37 which is of variable pitch as before and provides the flow E and an inner tier 38 which is of fixed pitch and provides the flow D so that it is operative solely to charge the compressor 4. Operating shafts connected to the roots of the outer tier blades 37 pass through the inner tier blades 38 which are of hollow aerofoil section, the two sets of blades being radially aligned. The blades 37 are mounted so as to be rotatable about their axes in a rotating shroud ring 39 which separates the two tiers of blading, and the two concentric annular flow paths, along the duct 3 and to the compressor inlet 13 respectively, are separated from each other by static shrouding 40 extending the whole length of the fan duct 3. A ring of stator blades 41 of fixed pitch is mounted within the shrouding 40.

Thus, along the inner flow path D the air always passes rearwardly to the inlet 13 of the compressor 4 while the air may pass rearwardly or forwardly along the outer flow path E alternatively at will. Although the inner tier blading 38 has been described as of fixed pitch it may if desired be of variable, but positive or non-reversible, pitch if it is desired to utilise the fan 1 to provide variable supercharging of the compressor 4.

We claim:

1. An aircraft propulsion system comprising a gas turbine engine having an engine compressor and a duct for the flow of pressure air leading to said compressor, and means for inducing flow of pressure air along said duct toward the engine compressor and for reversing the direction of air flow within the duct at will.

2. A gas turbine engine comprising a single-stage fan, a duct in which said fan is rotatable, a compressor for said engine, said fan being mounted ahead of said compressor with respect to the direction of air flow through the duct, said fan having blading, and means for reversing the pitch of said blading to reverse the direction of air flow along the duct.

3. A gas turbine engine according to claim 2, wherein said means for reversing the direction of air flow along the duct comprises means for putting the fan blades into negative pitch during rotation of the fan.

4. A gas turbine engine according to claim 2, wherein the fan blading is of variable pitch.

5. A gas turbine engine according to claim 4, wherein the pitch of the fan blading is infinitely adjustable through a range which includes not only positive and negative pitch but also zero, or near zero, pitch and the feathered position.

6. A gas turbine engine according to claim 5, wherein the change from positive to negative pitch of the fan blading occurs through zero pitch.

7. A gas turbine engine according to claim 2, and flap valve means to close an air entry to the inlet of the compressor from a point slightly aft of said inlet, said flap valve means being operable to open said air entry and ensure that air is drawn smoothly into the compressor when the flow of air passes forwardly along the duct.

8. A gas turbine engine according to claim 2, and a fixed deflector arranged slightly aft of the inlet of the compressor to split the flow of air whether the latter be passing rearwardly or forwardly along the duct.

9. A gas turbine engine according to claim 2, and stator blading carried by the duct immediately behind the fan blading.

10. A gas turbine engine comprising a fan, a duct in which said fan is rotatable, a compressor for said engine, said fan having a single stage of blading and being mounted ahead of said compressor with respect to the direction of air flow through the duct, and means for reversing the direction of air flow within the duct.

11. A gas turbine engine according to claim 10, and means for directing the flow of air to the inlet of the compressor when the direction of air flow is reversed.

12. A gas turbine engine comprising a single-stage fan having variable pitch blading, a compressor for said engine, a by-pass duct in which said fan is rotatable ahead of said compressor to provide a flow of pressure air to the inlet of the compressor, and means for varying the pitch angle of the fan blading from a negative angle through zero to a positive angle and thereafter through increasing pitch to a feathered position, thereby to control the by-pass flow from a negative value, through zero to a maximum positive value.

13. A gas turbine engine comprising a single-stage fan, a duct in which said fan is rotatable, a compressor for said engine, said fan being mounted ahead of said compressor with respect to the direction of air flow through the duct, said fan having blading, means for reversing the pitch of said blading to reverse the direction of air flow along the duct, and flap valve means comprising a series of pivoted flap valves which overlap each other to form an annulus and which close an air entry to the inlet of the compressor from a point slightly aft of said inlet, said flap valve means being operable to open said air entry and in the corresponding open position said flap valves projecting into the duct whereby to split a forward air flow along the duct into an outer flow continuing along the duct and an inner flow, passing forwardly and inwardly of the flap valves, into the inlet of the compressor to ensure that air is drawn smoothly into the compressor when the flow of air passes forwardly along the duct.

14. A gas turbine engine comprising a single-stage fan, a duct in which said fan is rotatable, a compressor for said engine, said fan being mounted ahead of said compressor with respect to the direction of air flow through the duct, said fan having blading, means for reversing the pitch of said blading to reverse the direction of air flow along the duct, and an axially movable annular deflector movable across the inlet of the compressor between rearward and forward positions to split the air flow whether the latter be passing rearwardly or forwardly along the duct.

15. A gas turbine engine comprising a single-stage fan, a duct in which said fan is rotatable, a compressor for said engine, said fan being mounted ahead of said compressor with respect to the direction of air flow through the duct, said fan having blading, means for reversing the pitch of said blading to reverse the direction of air flow along the duct, and means for applying suction to a leading edge of the rear wall of the inlet of the compressor to induce splitting-off from the air flowing forwardly in the duct of a portion of the flow into the compressor.

16. A gas turbine engine comprising a single-stage fan, a compressor for said engine, a by-pass duct in which said fan is rotatable ahead of said compressor, said fan being of tiered construction to provide two concentric annular flow paths, an inner to the inlet of the compressor and an outer to the by-pass duct, an outer tier of blading of the fan associated with the outer flow path being of reversible pitch, and means for varying the pitch angle of said outer tier of blading from a negative angle through zero to a positive angle and thereafter through increasing pitch to a feathered position, thereby to control the by-pass flow from a negative value, through zero to a maximum positive value.

17. A gas turbine engine according to claim 16, and shrouding extending along said duct and separating said duct into two concentric annular flow paths.

References Cited

UNITED STATES PATENTS

| | | | |
|---|---|---|---|
| 3,279,181 | 10/1966 | Beavers et al. | 60—226 |
| 3,280,561 | 10/1966 | Knutney | 60—226 |

FOREIGN PATENTS

| | | |
|---|---|---|
| 502,514 | 5/1954 | Canada. |
| 70,616 | 1/1950 | Denmark. |
| 866,145 | 2/1953 | Germany. |
| 244,980 | 6/1947 | Switzerland. |
| 457,026 | 5/1950 | Italy. |
| 704,669 | 2/1954 | Great Britain. |

ROBERT M. WALKER, Primary Examiner

U.S. Cl. X.R.

60—226; 415—129, 145